Feb. 27, 1968
D. D. CALL
3,371,332
PANNING RATE INDICATOR
Filed April 13, 1965
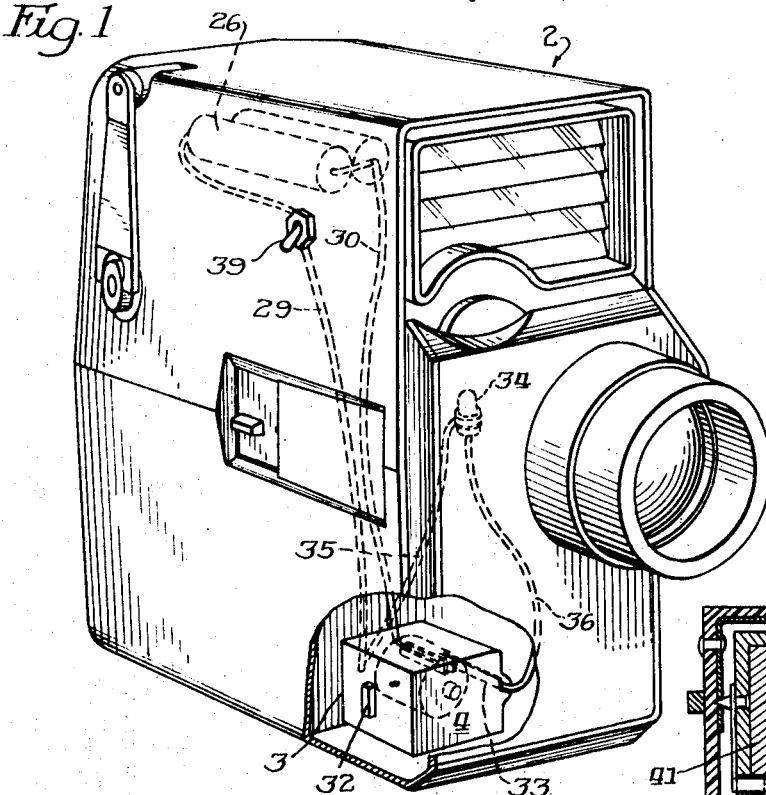
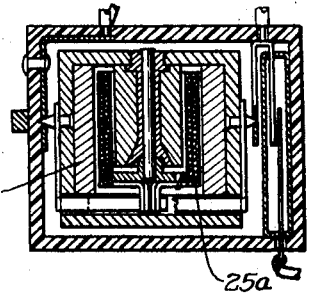
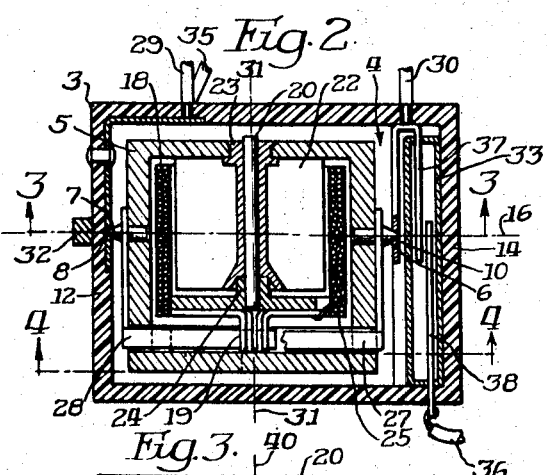
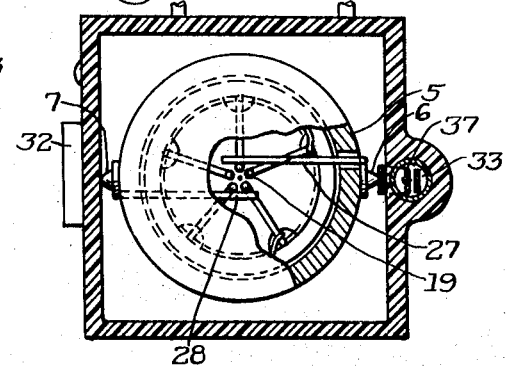
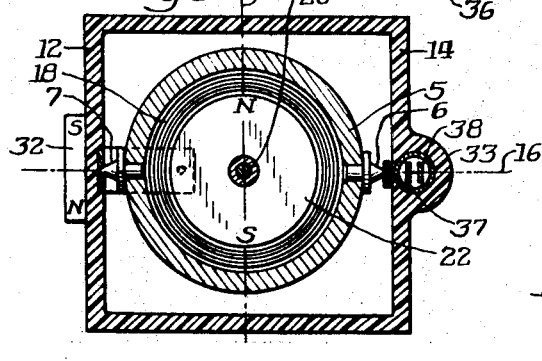
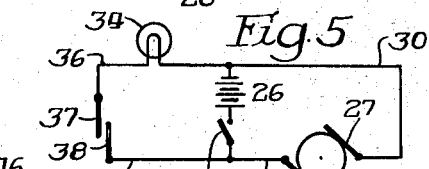
Inventor
Daniel D. Call
By Griffin and Stokes
Attys

United States Patent Office 3,371,332
Patented Feb. 27, 1968

3,371,332
PANNING RATE INDICATOR
Daniel D. Call, Elk Grove Village, Ill., assignor to Bell & Howell Company, Chicago, Ill., a corporation of Illinois
Filed Apr. 13, 1965, Ser. No. 447,816
14 Claims. (Cl. 340—263)

ABSTRACT OF THE DISCLOSURE

There is herein disclosed a panning rate indicator for a moving picture camera wherein a motor is mounted within a non-conductive housing so that it is pivotable against a spring bias about an axis which is orthogonal to the spin axis of the motor's rotor. A reed switch is mounted in the housing and adapted to be actuated by the magnetic field of the motor's stator when the motor pivots a predetermined amount about the orthogonal axis. Closure of the reed switch permits power to be directed to a lamp which, when lit, indicates that the camera is being panned more rapidly than a predetermined desired rate.

This invention relates to a motion rate indicator and more particularly to a device for indicating that an instrument is being rotated faster than a desired predetermined rate.

Many instruments are sensitive to rotation rates in excess of some predetermined amount. This is particularly true in the case of optical devices, especially the type which have free floating optical elements therein, such as certain types of telescopes which include seismic stabilization devices. Often, gun sighting mechanisms and aerial scanning devices, for example, include elaborate mechanisms for insuring that the viewer does not rotate the instrument faster than some predetermined rate. Other such instruments are equipped with disenabling devices whereby electrical outputs from scanning or sighting mechanisms are inhibited if a predetermined rate is exceeded. Accordingly, it is an object of this invention to provide a simple and convenient means for indicating that an instrument is being rotated in excess of some predetermined rate.

A movie camera is perhaps the most common type of optical device wherein too rapid a rotation of the instrument will defeat the purposes for which the instrument is intended. For this reason, although it is suitable for use in a wide variety of instruments, preferred embodiments of the invention will herein be illustrated as being used in combination with a movie camera.

When a user takes pictures with a movie camera he frequently desires to obtain a panoramic view of a particular subject. Hence, the user swings the camera through an arc about his body as an axis. This operation is normally referred to as "panning." If the user of a telescope pans too rapidly the fact is immediately apparent to him because his view is not what he would like it to be. Where the viewer intends his efforts to be used in a secondary manner such as the direction of a gun barrel or the recording of the field of view on film, he is not so immediately aware of his error. In the case of a movie camera, for example, there is no correlation between the ability of the user's eye to adapt to a changing field of view and the ability of the film to record that changing field of view. Indicative of the seriousness of this matter is a recent estimate by a group of trade association members in the camera field that 80% of all home movie film spoilage results from the operator panning too rapidly.

Because of the great amount of movie film that is spoiled by panning too rapidly, various types of excessive panning rate indicators have been suggested in the past. These devices, however, have either been far too complicated and elaborate to be of any practical use in small instruments such as the home movie camera or they have been comprised of a series of viewing windows and levers attached to seismic masses or gyros. In the latter case, the gyros or masses had to be so large to overcome the friction and inertia of the levers that they too have been unsuitable for small instruments and especially unsuitable for small hand held instruments such as movie cameras.

Accordingly, it is another object of this invention to provide a means for indicating to an instrument's operator that he is panning too rapidly and particularly to a camera operator that his panning rate exceeds the limits of good photography.

It is another object of this invention to provide an excessive panning rate indicator that is capable of being small and yet sensitive.

It is a still further object of this invention to provide an excessive panning rate indicator whereby the user receives an indication of an excessive panning rate without having his attention distracted from the use for which the instrument is intended.

Another drawback of the gyroscopic types of indicators that have been suggested in the prior art is that they have tended to merely provide an indication of rotation per se rather than indication of rotation in excess of a certain rate. Accordingly, it is another object of this invention to provide a mechanism which tolerates a certain panning rate and merely provides an indication when that rate is exceeded.

According to the principle of the invention a rotatable element is located within the instrument housing and rotated about an axis which is perpendicular to the axis about which the panning will occur, the rotor thereby having a determinable degree of stability about the panning axis. The rotor has a magnetic element associated with it which is stabilized by and with the rotor. An indicating means is controlled by a switch which is located in the instrument housing and is actuated in response to relative motion of the rotor caused by panning. Hence, as the instrument is rotated too rapidly the switch closes and the indicator, responsive to the switch closing, indicates to the user that he is panning at too rapid a rate.

In order to permit at least a certain rate of panning without getting an indication of an excess thereof, a magnet may be attached to the housing in opposed magnetic relationship to the magnetic element associated with the rotor. These opposing magnetic forces, acting as a spring, permit an excessive-rate indication only when the panning torque causes the rotor to overcome the magnetic spring forces to an extent that the rotor's motion actuates the switch.

The foregoing and other objects, features, and advantages of this invention will be apparent from the following more particular description of preferred embodiments thereof, as illustrated in the accompanying drawings.

FIG. 1 is a perspective view, partially broken away, of a movie camera including an excessive panning rate indicator embodying the invention;

FIG. 2 is a horizontal sectional view taken along the axis of the rotor in FIG. 1;

FIG. 3 is a vertical sectional view of an excessive panning rate indicator according to the invention taken along the lines 3—3 in FIG. 2;

FIG. 4 is a vertical sectional view of an excessive panning rate indicator according to the invention taken along the lines 4—4 of FIG. 2;

FIG. 5 is a schematic diagram of an electrical circuit which is suitable for use with the embodiments of the invention illustrated in FIGS. 1–4.

FIG. 6 is a horizontal sectional view of an alternative embodiment of the invention illustrated in FIG. 2.

In FIG. 1 a movie camera 2 has a body portion 3 which is preferably of a non-magnetic, non-shielding material such as nylon. The body portion provides a housing for a gyro mechanism shown generally as 4. In FIGS. 2–4, the gyro mechanism is comprised of a gimbal ring 5 which is mounted by means of gimbal pivots 6 and 7 pivoted in bearing members 8 and 10 located at the left and right hand portions 12 and 14, respectively, of the housing. In this manner, the gimbal ring 5 is rotatable with respect to the housing about an axis 16, shown as being horizontal in FIG. 2. A rotor 18 is mounted, by means of a commutator ring 19, for rotation about a shaft 20 to which is fastened a stator element 22. The shaft 20 is fastened to the rear of the gimbal ring 5 at 23 as shown in FIG. 2.

The stator 22 is comprised of a permanent magnet having north and south poles as shown in FIG. 3. The rotor is rotatable about the shaft 20 on a bearing assembly 24 and driven by means of an electrical potential applied to coils 25 thereof through the commutator ring 19. In the preferred embodiment the electrical potential is derived from a set of batteries 26 (FIG. 1), and delivered to a set of brushes 27 and 28 as shown in FIGS. 2 and 4 by means of leads 29 and 30. Hence, as the electrical potential is applied to the commutator ring the rotor rotates about a spin axis 31 shown as a vertical line in FIG. 2, but perspectively horizontal in the camera of FIG. 1. The elements described thus far, therefore, comprise a DC motor having an external rotor. Because of the rotation of the mass of the rotor 18 about the shaft 20, the structure just described also functions as a gyroscope that is stabilized against movement away from the spin axis 31. Consequently, whenever the rotor is rotating, the rotor's spin axis tends to remain stationary in space.

On the left side of the housing 3 is a permanent magnet 32 having north and south poles thereon in opposed vertical alignment with the poles of the stator element 22 as shown in FIG. 3. A paramagnetic reed switch 33 is horizontally located on the right hand side of the housing and is connected in series with a lamp 34 across the batteries 26 by means of leads 35 and 36 as shown in FIGS. 1 and 5. The reed 37 of the reed switch 33 is adapted to move back and forth in the figures so as to make and break contact with the other reed 38. In a sufficiently strong magnetic field, however, the reed 37 is attracted to its contact position with reed 38. Hence, when the reed switch is subjected to a sufficiently strong magnetic field the switch is closed, but when the magnetic field is sufficiently diminished the switch opens. That is to say, the reed switch is of the normally open type.

Having described the structure of the panning rate indicator of the invention the operation thereof will now be described. Prior to the time that a user takes pictures with a camera embodying the invention he should apply power to the gyro rotor by closing a switch 39. This operation causes the gyro rotor to rotate about the shaft 20. Once the rotor is up to speed it will tend to remain stable against movement away from its spin axis. At this time the gyro magnet's lines of force do not sufficiently link the reeds of switch 33 and the switch is open.

The magnetic forces of the stator 22 and the permanent magnet 32 form a magnetic spring. That is, the magnetic forces therebetween tend to resist pivotal motion of the rotor about the axis 16. In FIG. 3, for example, if the gyro is pivoted downwardly at its near end the stator's north pole is attracted towards the permanent magnet's south pole whereby the rotor tends to return to its original horizontal position.

As the camera is panned about a vertical axis a constant angular velocity is applied to the gyro about a vertical axis 40 in FIG. 3. The predominant angular momentum of the rotor is about its spin axis 31, and when it is forced to precess about the vertical axis 40 it immediately develops a torque about the horizontal axis 16 which is resisted by the magnetic spring described above. Consequently, when the camera is panned the magnetic spring forces between the stator and the magnet 32 oppose the tendency for upward or downward relative motion between the gyro and the housing. As the panning rate increases, however, the magnetic spring forces are overcome to the point where the stator's lines of force link the reeds of switch 33 whereby the reed 37 comes into contact with the reed 38. In this manner, the reed switch is actuated only when the camera is panned more rapidly than some predetermined rate.

As soon as the reed switch is actuated the circuit is completed between the battery 26, the lamp 34, and the reed switch. Consequently, the lamp 34 begins to glow thereby indicating that the operator is panning too rapidly.

In the preferred embodiment of the invention the lamp is located within the camera housing so that its glow is projected within the area viewed by the user as he takes photographs. In this manner, the user is informed that his panning rate is beginning to exceed the limits of good photography, without the necessity of his having to view a separate panning rate indicator. Hence, he is able to concentrate on the subject matter of his picture.

The invention has been discussed in terms of a horizontal panning motion; but it should be noted that a similar structure can be employed for vertical panning. In that case, it is merely necessary to mount the rotor for pivotal motion about the vertical axis in FIG. 3.

Similarly, although the invention has been discussed in connection with a normally-open reed switch it should be noted that normally-closed reed switches can also be used. For example, when normally-closed reed switches are mounted on the rear wall of the housing (both above and below the neutral position of the rotor's spin axis) they close as soon as the stator swings to the point where the switch is effectively out of its magnetic field. Consequently, when a thusly located normally-closed reed switch is connected in the circuit of FIG. 5, the lamp 34 lights in response to an excessive panning rate, just as it does in the case of the normally open switch described above.

Moreover, although the invention has been described with respect to a single reed switch it will be appreciated by those skilled in the art that an indication of a progressively excessive panning rate may be obtained by placing a plurality of reed switches in the path taken by the rotor's magnetic field as it is displaced off of the horizontal axis 16 during panning. In this manner, merely by properly connecting the reed switches into a suitable electrical circuit the lamp is made to glow more brightly as the operator pans more rapidly. This modification has particular utility where the photographer is willing to sacrifice clarity of picture in order to have any picture at all. This occurs, for example, when photographing a moving object whereby the camera must be panned as rapidly as the object moves. In this case the operator is willing to accept a moderate glow of the lamp. When the lamp begins to glow so brightly as to indicate that no satisfactory picture could be obtained at all, the photographer stops photographing in any event. On the other hand, when a photographer pans a stationary scene, even a faint glow induces him to slow down his panning rate.

In general, the more powerful a camera's lens, the more sensitive the camera is to panning. That is, a panning rate that is quite acceptable for a low powered lens might be wholly unacceptable for a high powered lens. Accordingly, it should be appreciated that in the instant invention the panning rate at which an indication of excessive panning is given can be altered very simply. For example, if it is desired to permit a greater panning rate it is merely necessary to install a reed switch which requires a greater magnetic field to close it. Another modification which can be made to alter the permitted panning rate is to alter the strength of the permanent magnet 32. For example, the weaker the permanent magnet the more easily the rotor rotates about the horizontal axis 16, and the lower the panning rate required in order for the lamp to light. Hence, the magnet may be replaced with a simple iron bar having little if any magnetism.

Also, although the invention has been illustrated as having a single permanent magnet 32, it will be appreciated by those skilled in the art that a magnetic spring can be obtained by means of a plurality of permanent magnets located so that their poles are in opposition to the poles of the stator. Similarly, although the indicating means just described was a lamp, a buzzer or other similar indicating means could also be used.

In view of the above description it will be apparent that the invention provides a simple and convenient means for indicating that the instrument is being rotated in excess of a predetermined rate. Moreover, the invention is adapted for use in small instruments and is especially suitable for small hand held instruments such as a movie camera which requires that a panning rate indicator be both small and sensitive.

The embodiment described thus far has an externally mounted rotor on the DC motor. This type of motor, although admirably suited for the instant invention is sometimes difficult to obtain in particular sizes. It is a fundamental principle of gyroscopes that the greater the radius of gyration, the greater the gyro's stabilizing abilities. Hence, because of its larger radius of gyration the externally mounted rotor has the inherent advantage of greater stability over the internally mounted rotor normally employed in DC motors. An embodiment of the invention using an internally mounted rotor is illustrated in FIG. 6. Therein, the device is in all respects the same as that described above except that the rotor 25a is located internally of a stator element 41.

As in the case of most commercial products a balance may be struck between manufacturing economy and the inclusion in the product of certain desirable features. In the former embodiment the gyro, because of its external rotor, has the desirable feature of being smaller, lighter, and more stable than an embodiment of the invention including an internal rotor. On the other hand, the latter embodiment might be less expensive to manufacture and perhaps more desirable for that reason. In either embodiment of the invention, however, a mechanism has been described whereby a photographer can obtain a non-distracting indication that he is panning too rapidly and thereby prevent the spoilage of countless feet of film.

Also, it should be noted that although the invention has been described in connection with a reed switch that other types of switches might be employed so long as they are sensitive to rotation of the rotor caused by an operator's panning of the instrument.

While the invention has been particularly shown and described with reference to preferred embodiments thereof, it will be understood by those skilled in the art that various changes in form and details may be made therein without departing from the spirit and scope of the invention.

The embodiments of the invention in which an exclusive property or privilege is claimed are defined as follows:

1. A device for indicating that the panning rate of an instrument exceeds a predetermined amount, comprising:
    a housing;
    a gyro mounted within said housing and adapted to:
        rotate about a spin axis;
        and pivot with respect to said housing about an axis orthogonal to said spin axis;
    magnetic means forming a part of said gyro and pivotal therewith;
    a paramagnetic switch member mounted in said housing and adapted to be actuated when said gyro pivots a predetermined amount about said orthogonal axis;
    and an indicating means responsive to the actuation of said switch for indicating that the instrument is being panned more rapidly than a predetermined desired rate.

2. The apparatus of claim 1 including means for biasing said gyro against pivotal motion about said orthogonal axis.

3. The apparatus of claim 1 including second magnetic means mounted so as to oppose the magnetic field of said gyro for tending to oppose rotation of said motor about said orthogonal axis.

4. A device for indicating that the panning rate of an instrument exceeds a predetermined amount comprising:
    a housing;
    a motor having a rotor element and a stator element and wherein said stator element has a magnetic field associated therewith;
    mounting means for mounting said motor within said housing so that said motor is pivotal about an axis which is orthogonal to the axis of rotation of said rotor;
    a paramagnetic switch member mounted in said housing and adapted to be actuated when said stator pivots a predetermined amount about said orthogonal axis;
    and an indicating means responsive to the actuation of said switch for indicating that the instrument is being panned more rapidly than a predetermined desired rate.

5. The apparatus of claim 4 including a spring means for biasing said motor against the pivotal motion about said orthogonal axis.

6. The apparatus of claim 4 including a magnet mounted so that its magnetic field opposes the magnetic field of said stator for tending to oppose rotation of said motor about said orthogonal axis.

7. The apparatus of claim 4 wherein said rotor element substantially surrounds said stator element.

8. The apparatus of claim 7 including a magnet mounted so that its magnetic field opposes the magnetic field of said stator for tending to oppose rotation of said motor about said orthogonal axis.

9. The apparatus of claim 4 wherein said stator element substantially surrounds said rotor element.

10. The apparatus of claim 9 including a magnet mounted so that its magnetic field opposes the magnetic field of said stator element for tending to oppose rotation of said motor about said orthogonal axis.

11. In a moving picture camera the combination comprising:
    a housing located within said camera and substantially comprised of a non-conducting material;
    a motor comprised of:
        a rotor element rotatable about a spin axis thereof, and a stator element having a magnetic field associated therewith;
    means for pivotally mounting said motor within said housing so that it is pivotable about an axis orthogonal to said spin axis;
    a power source;
    means connecting said power source to said motor for causing said rotor to spin about said spin axis;
    a paramagnetic switch member mounted in said housing and adapted to be actuated when said motor pivots a predetermined amount about said orthogonal axis;
    an indicating means connected to said power source by said paramagnetic switch and operative in response to the actuation of said switch for indicating that the instrument is being panned more rapidly than a predetermined desired rate;

and a spring means for biasing said rotor against said pivotal motion about said orthogonal axis.

12. A device for indicating that the panning rate of an instrument exceeds a predetermined amount comprising:
   a housing;
   a motor having a rotor element and a stator element and wherein said stator element has a magnetic field associated therewith;
   mounting means for mounting said motor within said housing so that said motor is pivotal about an axis which is orthogonal to the axis of rotation of said rotor;
   switch means mounted within said housing so that said switch is actuated in response to a predetermined degree of rotation of said motor about said orthogonal axis;
   an indicating means operative in response to the actuation of said switch for indicating that the instrument is being panned more rapidly than a predetermined desired rate; and
   a magnet mounted so as to oppose the magnetic field of said stator element for tending to oppose rotation of said motor about said orthogonal axis.

13. The apparatus of claim 12 wherein said rotor element substantially surrounds said stator element.

14. The apparatus of claim 12 wherein said stator element substantially surrounds said rotor element.

References Cited
UNITED STATES PATENTS

| | | | |
|---|---|---|---|
| 2,600,476 | 6/1952 | Bursack | 74—5.46 X |
| 2,898,552 | 8/1959 | McNatt. | |
| 3,053,095 | 9/1962 | Koril et al. | 324—70 X |

JOHN W. CALDWELL, *Primary Examiner.*

NEIL C. READ, *Examiner.*

D. L. TRAFTON, *Assistant Examiner.*